Aug. 13, 1957  E. G. COOPER  2,802,742
METHOD FOR THE PREPARATION OF MASHED POTATOES
Filed Jan. 14, 1955

INVENTOR
EVELYN G. COOPER

BY
*Holcombe, Wetherill & Brisebois*
ATTORNEYS

United States Patent Office 2,802,742
Patented Aug. 13, 1957

2,802,742

METHOD FOR THE PREPARATION OF MASHED POTATOES

Evelyn G. Cooper, Bethesda, Md.

Application January 14, 1955, Serial No. 481,909

2 Claims. (Cl. 99—100)

This invention relates to an apparatus and a method for the preparation of mashed potatoes from a dehydrated mixture.

It is an object of this invention to prepare a hydrated mashed potato from a dehydrated mixture of milk powder, and potato powder.

It is another object of this invention to make possible the preparation of a single serving of mashed potatoes from dehydrated ingredients.

It is still another object of this invention to have an apparatus that will prepare and deliver into a serving receptacle a single order or serving of mashed potatoes automatically from the ingredients thereof.

This invention comprises a steam vessel having admitted thereto along the sides thereof a mixture of steam and air under pressure in such quantities that it will heat, gelatinize a mixture of dried potato powder and milk powder. The exhaust from this vessel is generally through the bottom thereof so as to deliver the prepared potatoes into a serving receptacle.

The objects enumerated above and other advantages of this process will be apparent to one skilled in the art from the description and the drawings attached hereto, wherein.

Figure 1:
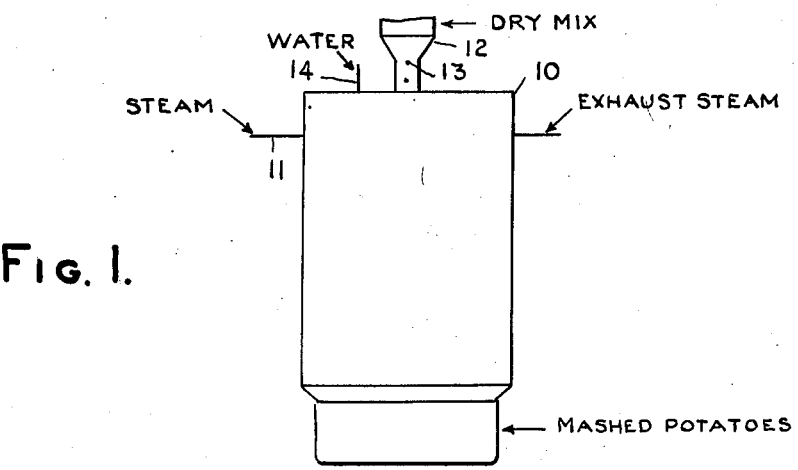
Fig. 1 is a side view of the apparatus.
Figure 2:
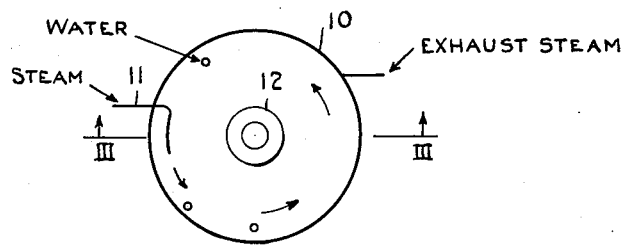
Fig. 2 is a top view of the same.
Figure 3:
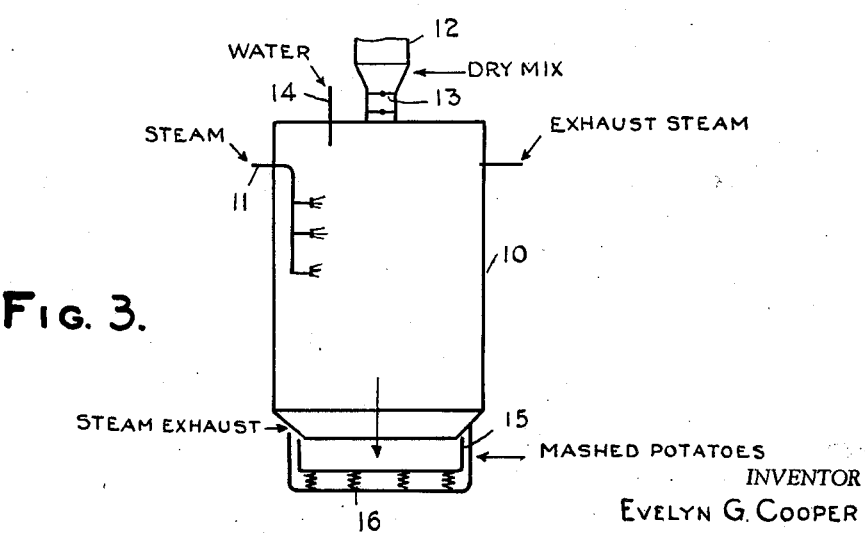
Fig. 3 is a sectional view on line 3—3 of Figure 2.

A vessel 10, shown in Figure 1, has a steam and air mixture line 11 entering the side thereof and exhausting into the vessel tangentially to the sides thereof so as to give a rotating and mixing action within this vessel. The dry ingredients are admitted in metered quantities from the hopper 12 through the metering device 13, shown in Fig. 3. Water if needed is added by means of the water inlet 14. The receptacle 15 is held in open contact with the base of the vessel so as to receive the mixture after treatment by means of the steam. An automatic switch (not shown) is operated by means of the receptacle when it is placed in contact with the spring retaining means 16, shown in Fig. 3. This switch admits the steam, opens the metering valve 13 and admits one measured quantity of the dry ingredients. These descend by gravity and contact the steam and air travelling at a high rate of speed around the sides of the vessel. This intimate contact of the mixture with the steam gelatinizes the potatoes and causes them to assume a fluffed, puffy condition. The exhaust from the vessel 10, around the edges of the receptacle 15 causes the depositing of the mixture in the receptacle 15, which when it has received the proper weight of material operates the automatic switch cutting off the steam and places the apparatus in condition for a second run when the receptacle 15 has been removed and a new receptacle placed therein.

The mixture of dehydrated potato powder, salt and dried milk are placed in the hopper 12. This is in the ratio of 100 parts of potato powder; ¼ part of salt and 2 parts of milk powder. The steam and water added to this mixture must be between 440 to 500 parts preferably about 460 parts of water. Using 100 grams of potatoes, 2 grams of dried milk and ¼ gram of salt it has been found that about 563 grams of mashed potatoes are obtained. This is the equivalent of 4 servings. The dried milk must be fat free, that is dried skimmed milk, and butter may be added after the potatoes have been removed from the treating equipment. The potatoes assume a fluffed texture that is most desirable for mashed potatoes, but if the butter is added to the mixture, before treatment, the potatoes will not retain the air and the mashed potatoes will have a flat unappetizing appearance. The 563 grams referred to above should be about four and one-quarter cups, due to the retention of the air within the mixture.

In practice a mixture of dried potato powder, salt and skimmed milk powder, in the ratio of 100 parts of potatoes, ¼ part of salt and 2 parts of skimmed milk powder are placed in the hopper 12. The receptacle 15 is placed within the spring retaining means 16. This operates the automatic valve mechanism which opens the steam, admitting a mixture of air and steam through conduit 11 and at the same time meters in through the top conduit 13 a mixture of 102 grams of the mixture of dried ingredients. The condensation of the steam forming water with the liberation of heat therefrom will cause the gelatinization of the potato and supply thereto the necessary 460 parts of water. This will take place within the pressurized vessel 10, the steam escaping principally around the receptacle 15, thereby forming the mixture in a fluffed condition into this receptacle. When the receptacle has received about 500 grams of weight it closes the valve in the steam line and prevents the entrance of more air and steam. The potatoes are then ready for removal and serving. The advantages of this system for use in a small restaurant is apparent. A connection with the necessary steam inlet running through an injector picks up the necessary air and carries it into the pressurized vessel. This then contacts the dried potato powder and other ingredients in metered quantities to prepare an amount of mashed potatoes. These may be served immediately and do not have a chance to become stale or hardened and allows the restaurant to serve potatoes in a fresh condition without loss, as is normally the case, heretofore.

It is apparent to a person skilled in the art that this process may be applied to other food products than potatoes where heat treatment and moisture is needed that is always necessary to restore the product to its normal condition.

I claim:

1. A method of preparing mashed potatoes, which comprises mixing 100 parts dehydrated potato powder, two parts of skimmed milk powder and seasoning and subjecting the same to 440 to 500 parts of steam, air and water.

2. A method of preparing mashed potatoes, which comprises mixing 100 parts dehydrated potato powder, two parts of skimmed milk powder and seasoning and subjecting the same to 460 parts of steam, air, and water to gelatinize the mixture.

References Cited in the file of this patent

UNITED STATES PATENTS

| 2,168,246 | Shepherd | Aug. 1, 1939 |
|---|---|---|
| 2,185,451 | Webb | Jan. 2, 1940 |
| 2,355,394 | Ross | Aug. 8, 1944 |
| 2,481,122 | Kaufman et al. | Sept. 6, 1949 |
| 2,674,935 | Lewis et al. | Apr. 13, 1954 |
| 2,729,566 | Harrington et al. | Jan. 3, 1956 |